United States Patent
Sattler

(10) Patent No.: US 9,061,414 B2
(45) Date of Patent: *Jun. 23, 2015

(54) DEVICE FOR GUIDING A POWER TOOL

(75) Inventor: Christian Sattler, Biessenhofen (DE)

(73) Assignee: Hilti Aktiengesellschaft, Schaan (LI)

( * ) Notice: Subject to any disclaimer, the term of this patent is extended or adjusted under 35 U.S.C. 154(b) by 600 days.

This patent is subject to a terminal disclaimer.

(21) Appl. No.: 13/314,725

(22) Filed: Dec. 8, 2011

(65) Prior Publication Data

US 2012/0145423 A1 Jun. 14, 2012

(30) Foreign Application Priority Data

Dec. 9, 2010 (DE) .......................... 10 2010 062703

(51) Int. Cl.
 *B23B 39/14* (2006.01)
 *B25H 1/00* (2006.01)
 *F16H 19/04* (2006.01)

(52) U.S. Cl.
 CPC .............. *B25H 1/0064* (2013.01); *F16H 19/04* (2013.01); *B23B 39/14* (2013.01)

(58) Field of Classification Search
 CPC ......... F16C 29/00; F16C 19/04; B23B 39/00; B23B 39/04; B23B 39/14; B23B 45/00; B23B 47/00; B23B 47/18; B23B 35/00; B25H 1/0064
 USPC .................. 384/42; 408/56, 76, 10, 110–111, 408/135–136, 87–88, 236; 173/46, 141; 368/295; 74/29–30, 32, 422
 See application file for complete search history.

(56) References Cited

U.S. PATENT DOCUMENTS

| 4,468,159 | A | * | 8/1984 | Oster | ............................... 408/56 |
| 4,582,105 | A |   | 4/1986 | Wolff | |
| 5,902,077 | A | * | 5/1999 | Halder | ............................... 408/9 |
| 6,309,148 | B1 |   | 10/2001 | Wang | |
| 6,871,997 | B2 | * | 3/2005 | Hartmann et al. | ............ 368/295 |
| 2004/0009045 | A1 |   | 1/2004 | Reichenberger | |
| 2006/0285932 | A1 |   | 12/2006 | Park | |
| 2012/0148176 | A1 | * | 6/2012 | Sattler | ............................. 384/42 |

FOREIGN PATENT DOCUMENTS

| DE | 3339438 | 5/1985 |
| DE | 10231878 | 1/2004 |
| EP | 1 380 391 | 1/2004 |

* cited by examiner

*Primary Examiner* — Thanh Truong
*Assistant Examiner* — Justin Citrin
(74) *Attorney, Agent, or Firm* — Davidson, Davidson & Kappel, LLC

(57) ABSTRACT

A device (3) for guiding a power tool (2) along an advancing direction (15), including a baseplate (9) that can be fastened to a substrate (8) by a fastener, of a guide rail section (21) that can be joined to the baseplate (9) by a joining mechanism (12) and that has a contour (18), and a guide carriage (13) for guiding the power tool (2) along the advancing direction (15), whereby the guide carriage (13) has a counter-contour (19) that can be made to engage with the contour (18), whereby a second guide rail section (22) is provided that can be joined to the first guide rail section (21) and that is configured so that it can rotate relative to the first guide rail section (21) around a rotational axis (23) that is parallel to the advancing direction (15).

8 Claims, 3 Drawing Sheets

DEVICE FOR GUIDING A POWER TOOL

This claims the benefit of German Patent Application DE 10 2010 062 703.8, filed Dec. 9, 2010 and hereby incorporated by reference herein.

The present invention relates to a device for guiding a power tool.

BACKGROUND

Prior-art devices for guiding a power tool along an advancing direction consist of a baseplate that can be fastened to a substrate by a fastening means, and of a guide rail section that can be joined to the baseplate by a joining mechanism and that has a contoured means. The power tool is arranged on the guiding device by means of a guide carriage and can be moved along the guide rail section by means of an advancing mechanism. The guide carriage has a counter-contoured means that can be made to engage with the contoured means.

SUMMARY OF THE INVENTION

When core holes are drilled, after the drilling procedure, the operator has to remove the drilled core as well as the drillings that accumulate in the drilled hole. In the case of drill bits having a large diameter, the problem arises that the drilled core is very heavy and the drilled hole created is located directly below the drill bit.

It is an objective of the present invention to provide a device for guiding a power tool in such a way that it becomes easier for the operator to do the tool-up work on the power tool and to remove the drilled core as well as the drillings from a drilled hole.

According to the invention, a second guide rail section is provided that can be joined to the first guide rail section and that is configured so that it can rotate relative to the first guide rail section around a rotational axis that is parallel to the advancing direction. The advantage of the rotatable, second guide rail section is that, for the tool-up work, the power tool can be rotated into a position that is ergonomically comfortable for the operator. In order to remove the drilled core from a drilled hole, the power tool is rotated into a position in which the drilled hole is accessible to the operator without hindrance.

Preferably, the first and second guide rail sections are joined by means of an axis element, whereby the axis element is mounted in a first bearing element of the first guide rail section and in a second bearing element of the second guide rail section. In this context, the first bearing element is arranged on an end of the first guide rail section that faces the second guide rail section, while the second bearing element is arranged on an end of the second guide rail section that faces the first guide rail section.

Especially preferably, the axis element is mounted in an additional bearing element of the second guide rail section, whereby this additional bearing element is arranged on an end of the second guide rail section facing away from the first guide rail section. The additional bearing element increases the stability and the orientation of the second guide rail section so that it is parallel to the rotational axis. Moreover, a locking means can be provided at the top of the second guide rail section in order to lock the second guide rail section by means of the axis element. The locking means, which is at the top, is readily accessible and easy to operate in comparison to a locking means that is arranged between the first and second guide rail sections.

In a preferred embodiment, the axis element is joined non-rotatably to the first guide rail section, while the second guide rail section is configured so as to be rotatable around the rotational axis relative to the axis element. This embodiment is advantageous when the axis element is mounted in two bearing elements of the second guide rail section that are installed on ends that are opposite from each other. Owing to this mounting, the axis element is properly guided and the orientation of the guide rails during the rotation around the rotational axis is stable and parallel to the advancing direction. This embodiment lends itself particularly well for long and/or heavy second guide rail sections.

In an alternative preferred embodiment, the axis element is configured so as to be joined non-rotatably to the second guide rail section and so as to be rotatable around the rotational axis relative to the first guide rail section. This embodiment is advantageous when the axis element is mounted in two bearing elements of the first guide rail section that are installed on ends that are opposite from each other. This embodiment lends itself particularly well for short and/or lightweight second guide rail sections.

Preferably, a device that serves to orient the second guide rail section is provided between the first guide rail section and the second guide rail section. A device for orienting the second guide rail section has the advantage that the second guide rail section can be rotated into a desired position, and an unintentional rotation out of the desired position is at least rendered more difficult.

Especially preferably, the device for orienting the second guide rail section has a first guide means that is arranged on the first guide rail section and a second guide means that is arranged on the second guide rail section. The second guide rail section can be rotated relative to the first guide rail section into the desired position. The two guide rail sections have to be precisely oriented in order to move the guide carriage from one guide rail section to the other guide rail section.

Especially preferably, the first guide means is integrated into the first bearing element, and the second guide means is integrated into the second bearing element. The bearing element with the integrated guide means can be produced as a separate component and then joined to a conventional guide rail.

In a preferred embodiment, the first and second guide means are structured identically and have an elevation and at least one depression. Identically structured guide means entail the advantage that they require less production work. In the basic position, the contoured means of the first and second guide rail sections are flush. The elevation of the first guide means engages with the depression of the second guide means, while the elevation of the second guide means engages with the depression of the first guide means. Since two latching positions are provided in the basic position, the orientation of the guide rail relative to the baseplate is more precise.

Especially preferably, the guide means has one elevation and three depressions, whereby the elevation and the three depressions are each arranged on a circle and are offset by 90° with respect to each other. The operator can place the second guide rail section in the basic position as well as in two preferred positions that are each offset by 90° with respect to the basic position. These preferred positions have the advantage that the operator can rotate the power tool into the preferred position without any measuring work, and an unintentional rotation out of the preferred position is at least rendered more difficult. Preferred positions in the guide means lend themselves for angles that need to be set frequently.

Preferably, the guide means has release grooves to release the elevation. The release grooves have the advantage of reducing the wear and tear on the surface caused by the elevation when the second guide rail section is rotated.

In another preferred embodiment, the guide means has a spring element. This has the advantage of reducing the wear and tear of the elevation of the guide means by limiting the pressure force on the elevation or on the edges of the depression. Due to the elevation with its springy configuration, it is possible to rotate out of the preferred positions against the spring element. Here, the spring element preferably has a ball and a pressure spring. The magnitude of the elevation, the overhang of the ball, is defined by a geometrical contact of the ball in the drilled hole in the guide means.

Preferably, a locking means is provided for locking the second guide rail section, whereby the second guide rail section can be moved by the locking means between a setting position in which the second guide rail section can be rotated around the rotational axis relative to the baseplate, and a locked position in which the second guide rail section is locked relative to the baseplate. The locking means makes it possible to lock the orientation of the second guide rail section relative to the first guide rail section, so that an unintentional rotation of the second guide rail section can be reliably prevented.

Especially preferably, the locking means for locking the second guide rail section is arranged on the top of the second guide rail section facing away from the first guide rail section. The top of the second guide rail section is readily accessible to the operator, so that a locking means installed at the top is easier to operate than a locking means that is arranged between the first and second guide rail sections.

Embodiments of the invention will be described below on the basis of the drawing. The drawing does not necessarily depict the embodiments true-to-scale, but rather, the drawing is presented in schematic and/or slightly distorted form whenever necessary for the sake of clarity. Regarding additions to the teaching that can be gleaned directly from the drawing, reference is hereby made to the pertinent state of the art. In this context, it should be taken into account that a wide array of modifications and changes pertaining to the shape and the detail of an embodiment can be made, without deviating from the general idea of the invention. The features of the invention disclosed in the description, in the drawing as well as in the claims, either on their own or in any desired combination, can be essential for the refinement of the invention. Moreover, all combinations of at least two of the features disclosed in the description, in the drawing and/or in the claims fall within the scope of the invention. The general idea of the invention is not limited to the exact shape or details of the preferred embodiment shown and described below, nor is it limited to an object that would be restricted in comparison to the subject matter claimed in the claims. Regarding the dimensional ranges given, values that fall within the cited limits can also be disclosed as limit values and can be employed and claimed as desired. For the sake of simplicity, the same reference numerals will be used below for identical or similar parts or for parts having an identical or similar function.

BRIEF DESCRIPTION OF THE DRAWINGS

The following is shown.

DETAILED DESCRIPTION

Figure 1:
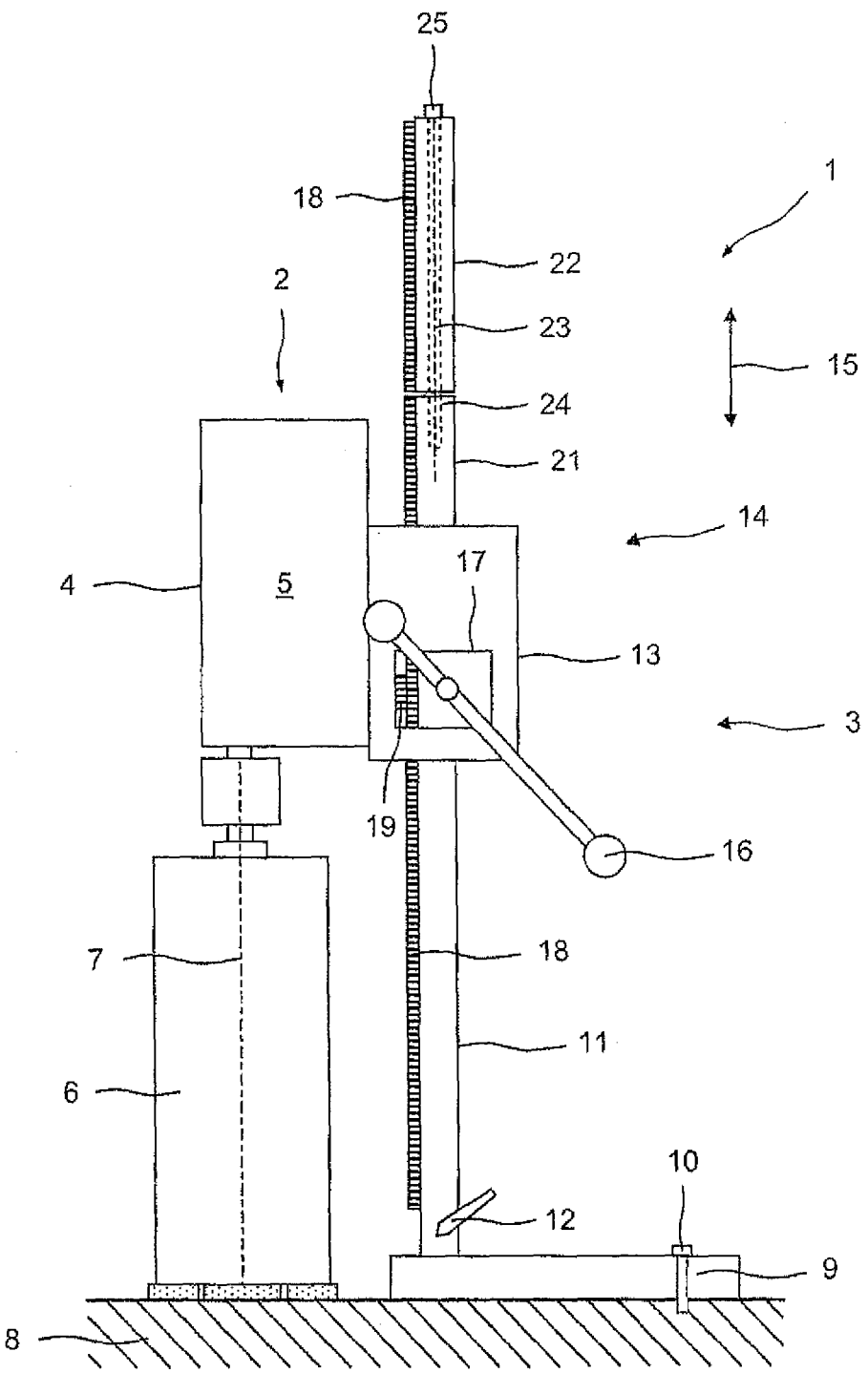
FIG. 1—a stand-mounted device system having a core-drilling device that is guided by means of a guide carriage on a guide rail of a drill stand, whereby the guide rail has a first guide rail section joined to a baseplate, and a second guide rail section configured so as to be rotatable relative to the first guide rail section.

FIG. 1 shows a schematic representation of a stand-mounted device system 1 includes a power tool 2 on which a guiding device 3 configured as a drill stand is arranged. The power tool is configured as a core-drilling device 2 and it comprises a machine unit 5 that is arranged in a machine housing 4 and that drives a drill bit 6 around a rotational axis 7.

The drill stand 3 is placed on a substrate 8 and includes a baseplate 9 that can be attached to the substrate 8 by a fastener or fastening means 10, and of a guide rail 11 that is joined to the baseplate 9 by means of a joining mechanism 12. The core-drilling device 2 is arranged on the drill stand 3 by means of a guide carriage 13, and it can be moved in an advancing direction 15 along the guide rail 11 by means of an advancer or advancing mechanism 14.

The advancing mechanism 14 comprises a drive or drive means 16 configured as a rotatable clamping rod and a transmission means 17 that transmits the movement of the drive means 16 onto the guide carriage 13. The rotational movement of the clamping rod 16 is converted by means of a toothed gear and a toothed rack into a movement of the guide carriage 13 along the guide rail 11. The guide rail 11 comprises a contour or contoured means 18 that is configured as a toothed rack and that engages with a counter-contour or counter-contoured means 19 of the transmission means 17 configured as a toothed wheel. The contoured means 18 and the counter-contoured means 19 are adapted to the drive means 16. The advancing movement of the guide carriage 13 can be generated by a manual or motor-powered drive means through a rotational movement or a linear movement. In the case of a linear drive movement, the transmission takes place, for example, via two toothed wheels.

The guide rail 11 includes a first guide rail section 21 that is joined to the baseplate 9 by means of the joining element 12, and a second guide rail section 22. The second guide rail section 22 is configured so as to be rotatable relative to the first guide rail section around a rotational axis 23 that is parallel to the advancing direction 15, whereby the rotational axis 23 also runs parallel to the rotational axis 7 around which the drill bit 6 is moved when the core holes are being drilled. The second guide rail section 22 is rotated by means of an axis element 24 that is mounted on the first and second guide rail sections 21, 22. The second guide rail section 22 can be adjusted by a lock or locking means 25 between a setting position in which the second guide rail section 22 can be rotated around the rotational axis 23 relative to the first guide rail section 21, and a locked position in which the second guide rail section 22 is configured to be non-rotatable relative to the first guide rail section 21.

Figure 2A:
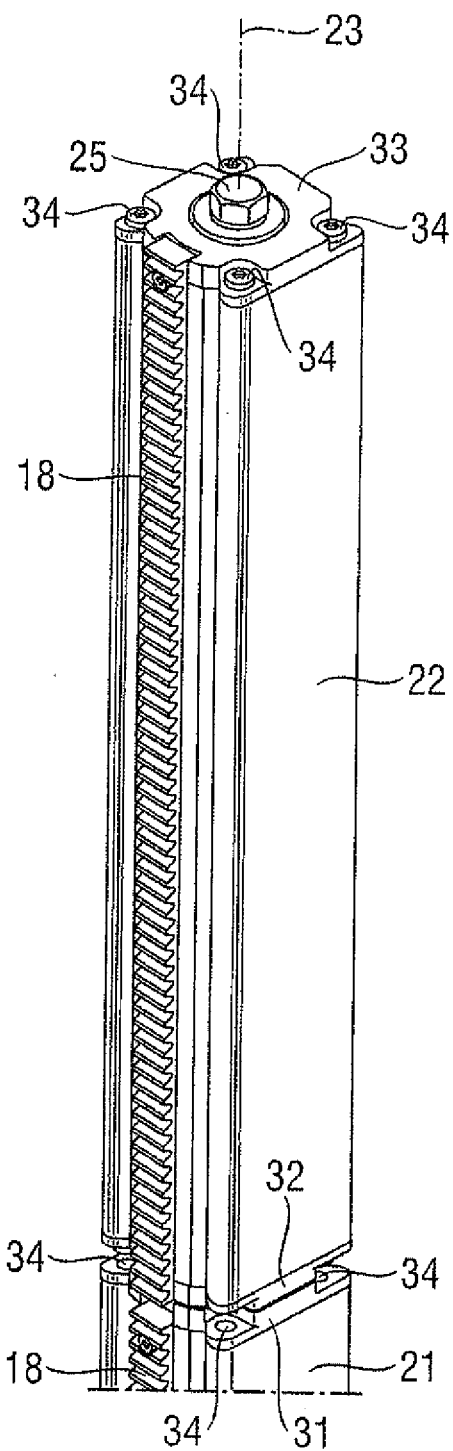
FIGS. 2A,B—the second guide rail section that can be rotated relative to the first guide rail section, in a three-dimensional view (FIG. 2A) and in a half-sectional view (FIG. 2B)
Figure 2B:
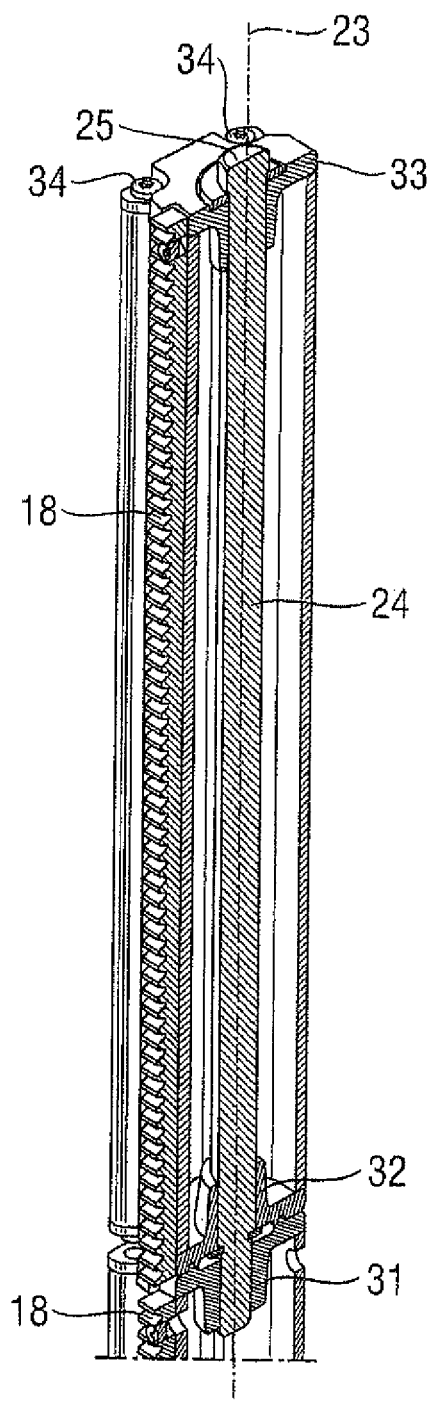

FIGS. 2A, 2B show the second guide rail section 22 that can be rotated relative to the first guide rail section 21 around the rotational axis 23, in a three-dimensional view (Figure a) and in a half-sectional view (FIG. 2B).

The second guide rail section 22 is rotated via the axis element 24 that is mounted in a first bearing element 31 of the first guide rail section 21 as well as in second and third bearing elements 32, 33 of the second guide rail section 22.

The first bearing element 31 is arranged at the top of the first guide rail section 21 facing the second guide rail section 22, and it is joined non-rotatably to the first guide rail section 21 by means of several screwed connections 34. At the bottom of the second guide rail section 22 facing the first guide rail section 21 or at the top of the second guide rail section 22 facing away from the first guide rail section 21, the second and third bearing elements 32, 33 are each joined non-rotatably to the second guide rail section 22 by means of screwed connections 34.

The axis element 24 is mounted non-rotatably in the first bearing element 31 when the second guide rail section 22 is in the locked position as well as when it is in the setting position. The second guide rail section 22 is configured to be rotatable around the rotational axis 23 relative to the axis element 24 when in the setting position, and so as to be non-rotatable relative to the axis element 24 when in the locked position.

The third bearing element 33, which is arranged on the top of the second guide rail section 22 facing away from the first guide rail section 21, has the advantage that the locking means 25, which is at the top, is readily accessible and easy to operate in comparison to a locking means that is arranged between the first and second guide rail sections 21, 22.

For the tool-up work or for removing the drilled core from the drilled hole, the core-drilling device 2 is moved along the guide rail 11 until the guide carriage 13 is positioned on the second guide rail section 22. When the locking means 25 is released, the second guide rail section 22 is moved from the locked position into the setting position. In the setting position, the second and third bearing elements 32, 33 of the second guide rail section 22 can be rotated around the rotational axis 23 relative to the axis element 24. The second guide rail section 22 is rotated into the desired position. If necessary, the second guide rail section 22 can be moved from the setting position into the locked position by closing the locking means 25. If this is the case, the locking means 25 has to be opened in order to reestablish the basic position.

After the tool-up work has been completed and/or after the drilled core has been removed from the drilled hole, the second guide rail section 22 and the core-drilling device 2 attached to it are rotated into the basic position. For safety reasons, the guide rail section may only be used to advance the guide carriage when the position of the guide rail is locked, that is to when say, when the second guide rail section 22 is in the locked position. If this is not the case, accidents or damage to the device system can occur.

Figure 3:
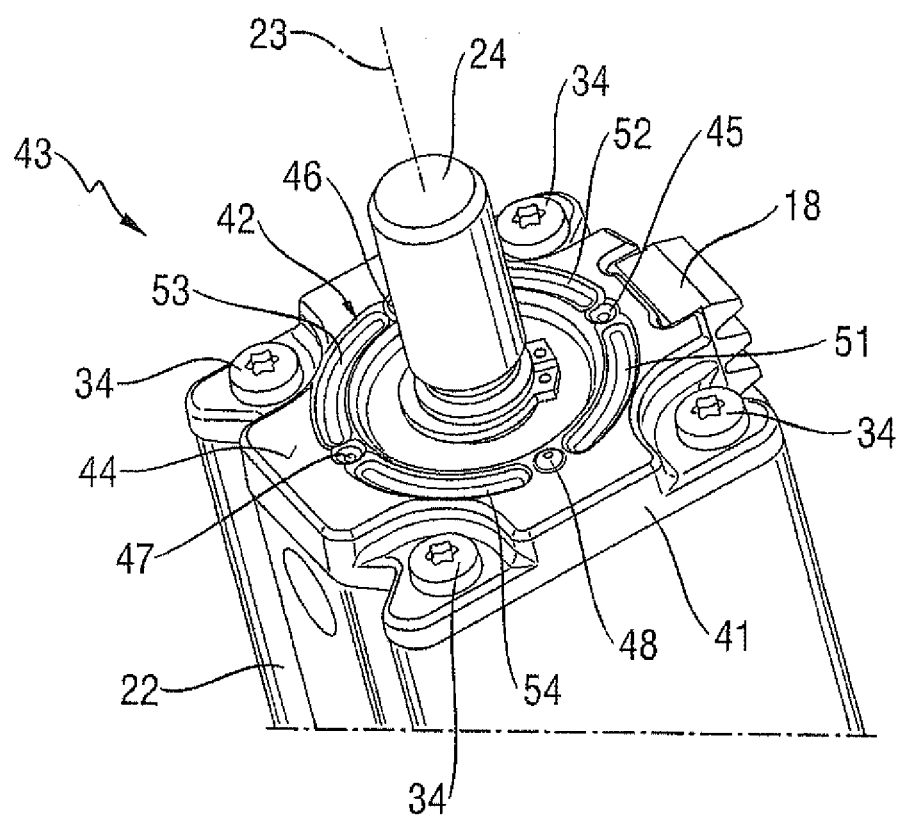
FIG. 3—a sectional view of the second guide rail section having a bearing element into which a guide means for orienting the second guide rail section is integrated.

FIG. 3 shows a sectional view of the second guide rail section 22 with a bearing element 41 for mounting the axis element 24, whereby the axis element 41 has a guide or guide means 42 that serves to orient the second guide rail section 22 relative to the first guide rail section 21.

For the rest, the structure of the bearing element 41 corresponds to the structure of the first and second bearing elements 31, 32 of FIGS. 2A, 2B and it is analogously joined non-rotatably to the second guide rail section 22 by means of screwed connections 34.

The guide means 42 is part of a device 43 for orienting the second guide rail section 22, and it is arranged between the first guide rail section 21 and the second guide rail section 22. The orienting device 43 comprises not only the guide means 42, which is designated as the first guide means 42 and which is provided on the second guide rail section 22, but also a second guide means which is integrated into the first guide rail section 21. In order to reduce the production work, the first guide means 42 and the second guide means are structured identically.

The bearing element 41 comprises a surface 44 that faces the first guide rail section 21, whereby the first guide means 42 is integrated into said surface. The first guide means 42 consists of first, second and third depressions 45, 46, 47 that are embedded into the surface 44. The depressions 45, 46, 47 are arranged offset to each other by 90° on an arc. The first guide means 42 also has a guide tab in the form of an elevation 48 that is likewise arranged on the arc and that is offset by 90° relative to the first and third elevations 45, 57. The elevation 48 is arranged offset by 180° with respect to the second depression 46.

Four release grooves 51, 52, 53, 54 are embedded into the surface 44 of the first guide means 42, and they are configured in the form of a circular segment. The first release groove 51 is arranged between the elevation 48 and the first depression 45, the second release groove 52 is arranged between the first and second depressions 45, 46, while the third release groove 53 is arranged between the second and third depressions 46, 47, and the fourth release groove 54 is arranged between the third depression 47 and the elevation 48.

In the basic position, the contoured means 18 of the first and second guide rail sections 21, 22 are flush with each other. The elevation 48 of the first guide means 42 engages with the second depression of the second guide means, while the elevation of the second guide means 42 engages with the second depression 46 of the first guide means 42. In order to remove the drilled core from the hole drilled into the substrate 8, the second guide rail section 22 is rotated around the rotational axis 23 into a position that is offset by 90°, in which the elevation 48 of the first guide means 42 engages with the first or third depression of the second guide means, and the elevation of the second guide means engages with the third or first depression 47, 45 of the first guide means 42.

When the elevation 48 of the first guide means 42 engages with a depression of the second guide means, there is a rotation lock that prevents the second guide rail section 22 from rotating without a force being exerted on it. The strength of the rotation lock can be set, for instance, by the height of the elevation. If the rotation lock is not sufficient, the second guide rail section 22 can be moved into the locked position by closing the locking means 25. In the locked position, the second guide rail section 22 is mounted so as to be non-rotatable relative to the first guide rail section 21.

What is claimed is:

1. A device for guiding a power tool along an advancing direction, the device comprising:
   a baseplate fastenable to a substrate by a fastener;
   a first guide rail section joinable to the baseplate, the first guide rail section having a toothed rack;
   a guide carriage for guiding the power tool along the advancing direction, the guide carriage having a toothed wheel engageable with the toothed rack;
   a second guide rail section joinable to the first guide rail section and rotatable relative to the first guide rail section around a rotational axis parallel to the advancing direction; and
   an orienter for orienting the second guide rail section and provided between the first guide rail section and the second guide rail section, wherein the orienter has a first guide arranged on the first guide rail section and a second guide arranged on the second guide rail section wherein the first and second guides are structured identically and have a projection and at least one depression, and wherein the second guide has three depressions, the projection and three depressions of the at least one depression each arranged on a circle and offset by 90° with respect to each other.

2. The device as recited in claim 1 wherein the first and second guide rail sections are joined by an axis element, the axis element mounted in a first bearing element of the first guide rail section and in a second bearing element of the second guide rail section.

3. The device as recited in claim 2 wherein the axis element is mounted in an additional bearing element of the second guide rail section, the additional bearing element is arranged on an end of the second guide rail section facing away from the first guide rail section.

4. The device as recited in claim 2 wherein the axis element is joined non-rotatably to the first guide rail section, while the second guide rail section is configured so as to be rotatable around the rotational axis relative to the axis element.

5. The device as recited in claim 1 wherein the first guide is integrated into a first bearing element of the first guide rail section, and the second guide is integrated into a second bearing element of the second guide rail section.

6. The device as recited in claim 1 wherein the second guide has release grooves to release the projection from the corresponding depression during a rotation around the rotational axis.

7. The device as recited in claim 1 further comprising a lock for locking the second guide rail section, the second guide rail section movable by the lock between a setting position, the second guide rail section rotatable around the rotational axis relative to the first guide rail section in the setting position, and a locked position, the second guide rail section configured to be non-rotatable relative to the first guide rail section in the locked position.

8. The device as recited in claim 7 wherein the lock for locking the second guide rail section is arranged on the top of the second guide rail section facing away from the first guide rail section.

\* \* \* \* \*